March 5, 1929.  E. E. SCOVILL  1,704,221
MUSIC EDUCATIONAL APPLIANCE
Filed Oct. 26, 1926
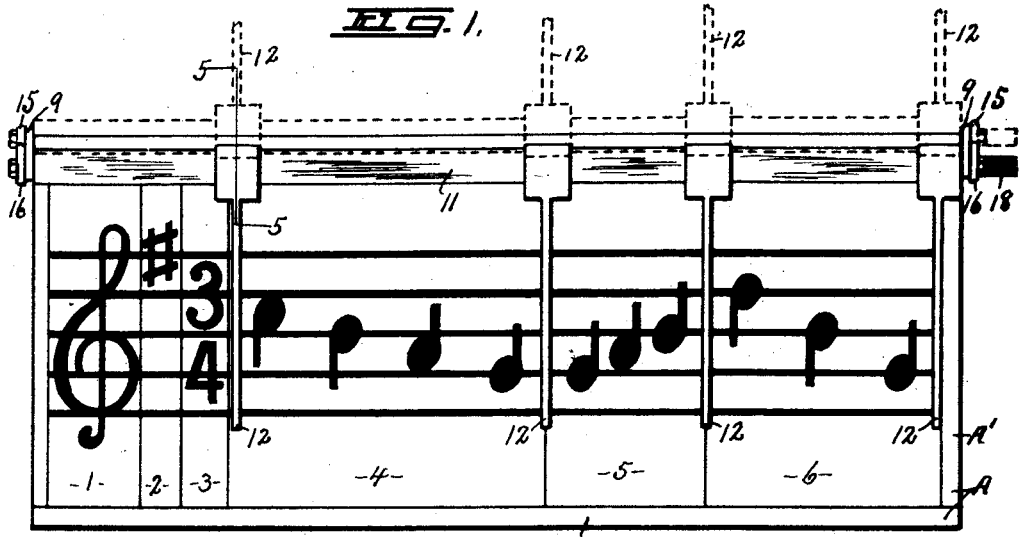
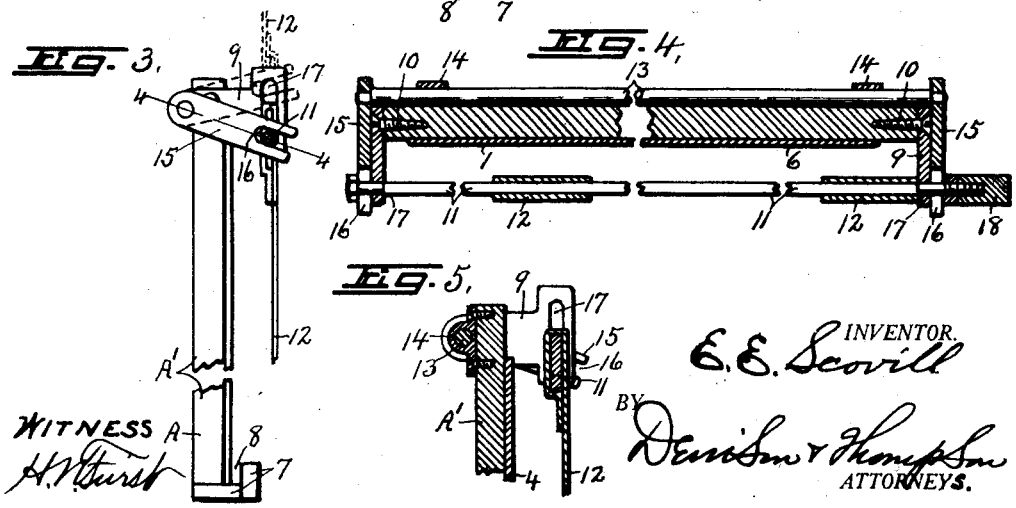
INVENTOR.
E. E. Scovill
BY
Denison & Thompson
ATTORNEYS.
WITNESS
H. V. Hurst Patented Mar. 5, 1929.

1,704,221

UNITED STATES PATENT OFFICE.

EDWARD E. SCOVILL, OF AUBURN, NEW YORK.

MUSIC EDUCATIONAL APPLIANCE.

Application filed October 26, 1926. Serial No. 144,258.

This invention relates to an educational appliance for teaching music adapted to be used in public schools and analogous places where it is necessary to instruct the pupils in class, but it will be evident that the same apparatus may be used by private teachers for the instruction of individuals in the fundamental or underlying principles of music.

The main object is to provide a simple device whereby the pupil may be taught to read music in groups or phrases in a staff under different clef, key, and time signatures as distinguished from the usual method of teaching the meaning of the different individual notes in different positions on the staff and separate instruction in the meaning of the different symbols indicating the different clefs, different keys and different time indicia.

One of the specific objects is to provide a series of reversible and invertible cards having obverse and reverse sides bearing the usual five staff lines, one of said cards having upon its opposite sides different clef signals, another card having upon its opposite sides different key signatures, another one or more of the cards bearing upon its opposite sides different time signatures while the remaining cards bear upon their opposite sides groups of notes differently positioned on the staff so that by inverting and reversing either card, four different groups of notes may be presented for instruction.

Another object is to provide the device with measure bars which may be adjusted to different positions along the staff for including a greater or less number of the notes of the several cards between them.

Another object is to enable all of the measure bars to be adjusted to and from a position across the staffs of the several note cards so that when displaced the cards may be more conveniently interchanged, reversed, and inverted or overlapped one upon the other.

Another object is to provide the apparatus with means for supporting the several cards in such manner that their respective staff lines will be horizontally alined.

A further object is to enable the cards to be used upon the display board or support for tone drill and contrasts, motive drill and tone drill and contrasts, motive drill and contrasts, phrase drill and contrasts, accent, beat and measure drill and contrasts, rhythm drill and contrasts, tetrachord and chord drill and contrasts, all contributing to expedite sight recognition and reading of various groups under their beat signatures as to clef, key and time and also facilitating the singing of the music language in a manner somewhat parallel to the sight recognition of a spoken language.

This device may also be used to indicate at will any change of position, key, scale, beat of the tone group, motif, measure, phrase, accent and also the measure position of the tone group and change of rhythm.

Furthermore by the use of this device the measure may be shortened or lengthened or the speed may be increased or diminished at will.

Other objects and uses relating to specific parts of the device will be brought out in the following description.

In the drawings:—

Figures 1 and 2 are obverse and reverse face views of a music educational appliance showing a limited number of cards adapted to be used in connection therewith.

Figure 3 is a transverse, vertical, sectional view of the same device, partly broken away.

Figure 4 is a horizontal sectional view, partly broken away, taken in the plane of line 4—4, Figure 3.

Figure 5 is an enlarged detail sectional view taken on line 5—5, Figure 1.

As illustrated, this appliance comprises a display board —A— of any suitable height or length convenient for handling and transportation from one place to another but capable of receiving and supporting edge to edge an indefinite number of cards such, for example, as the clef card —1—, a key card —2—, a time card —3— and any suitable number of note cards —4—, —5— and —6— each bearing upon its opposite faces different musical indicia hereinafter more fully described.

The display board —A— is provided along its lower edge with a horizontal ledge —7— having a lengthwise groove —8— adapted to receive the lower edges of the cards and to support said cards in an upright position resting against the back portion —A'—.

This display board is preferably of considerably greater length than height and is provided near its upper edge with opposite end brackets —9— secured thereto by screws —10— and projecting forwardly beyond the front face thereof for receiving and guiding the opposite ends of a vertically movable lengthwise bar —11— carrying a plurality of, in this instance, four spacing bars —12— shown more clearly in Figures 1, 3, 4 and 5.

A rock shaft —13— is journaled in suitable bearings —14— on the back of the board —A— near the upper edge thereof and is provided at its opposite ends with forwardly projecting arms —15— rigidly secured thereto and adapted to move vertically in close proximity to the outer faces of the brackets —9—, the front ends of said arms being slotted or bifurcated at —16— to receive the adjacent ends of the lengthwise bar —11—.

The brackets —9— are provided near their front ends with vertical slots —17— in which the adjacent ends of the bar —11— are movable to and from a position in front of the upper edges of the cards 1, 2, 3, 4, 5 and 6 when the latter are resting in the groove —8— of the ledge —7— and permitting said cards to be more easily removed by hand when the bar —11— is elevated to the position shown by dotted lines in Figure 3.

The portions of the bar —11— passing through the brackets —9— and arms —15— are preferably cylindrical but the remaining portions between the brackets —9— are angular or flat in cross section.

The upper ends of the measure bars —12— are slightly elongated lengthwise of the bar —11— and are provided with angular sockets therethrough corresponding to the cross sectional area of the bar —11— for receiving said bar and permitting the measure bars —12— to move therewith.

One end of the bar —11— outside of the corresponding arm —15— is provided with a handle —18— by which the entire bar with the measure fingers —12— thereon may be elevated along the slots —17— and rotated to shift the measure fingers —12— to and from a position across the front faces of the cards or from the position shown by full lines in Figures 1 and 3 to the positions shown by dotted lines in the same figures.

The cards 1, 2, 3, 4, 5 and 6 are of uniform height slightly greater than the distance between the ledge —7— and rod —11— when the latter is in its normal down position whereby the rod which extends along the front face of the cards near the upper edge thereof cooperates with the front edge of the ledge —7— in holding the cards against forward displacement, permitting them to be displayed by hand from the top forwardly and downwardly by simply lifting the rod —11— upwardly to the upper end of the slot —17— and then rocking said rod about its axis to move the fingers above the horizontal plane of the shaft —13—.

As previously stated the measure fingers —12— are looped around the flat supporting bar —11— to hold the fingers and bar against relative rotation and also to permit the measure fingers to be shifted along the bar and, therefore, along the staff on the cards for varying the length of the measures or number of notes which may be included in any measure as may be desired.

That is, the individual adjustability of the measure fingers relatively to each other along the staff permits the notes of any one or more or all of the cards to be divided into similar or different groups of two or more notes in each group.

The same notes, either with or without the accompanying clef, key and time symbols may, by the adjustment of the bars —5—, be divided into a large variety of different tone groups or phrases designated by as many different musical terms, all of which may be readily imparted to the pupil under proper instruction with the result that the pupil learns to read music languages in groups or phrases of various rhythms in a manner very similar to the reading of the spoken language and at the same time obtains a more accurate conception of each tone by reason of its association with other tones of any group.

After a sufficient amount of drill has been given upon the various groupings and phrasings of one particular display of tones under specific clef, key and time signatures, any one of these signatures may be changed by simply reversing its corresponding card and the tonal grouping instruction carried on as before in different groupings of the same notes under the changed clef, key or time or under changes of all of these signatures.

After sufficient instruction has been given in the grouping of the same notes under one display, either one or all of the cards may be reversed end for end for displaying a different combination of notes which may, by the adjustment of the bars —12—, be also divided into a large number of different groups under the same or different clef, key or time signatures.

In addition to the reversal of any one or all of the cards for displaying different combinations of notes one or more or all of the cards may be inverted to display the groups of notes on either face and thereby to produce still further and different combinations of notes, it being understood that, as illustrated, the staff lines are arranged substantially midway between the lower and upper edges of the cards so that when any one card is inverted or reversed its staff lines will register with those of the remaining cards.

It will also be evident that under the construction described the cards may be overlapped or interchanged to produce other different combinations which may also be divided into various groups by proper adjustment of the bar —5—.

It is evident that cards bearing different time symbols may be substituted for or superposed upon those shown and that other tone cards bearing different groups of notes may be substituted for or upon those shown and, when necessary, cards bearing different notes, time or clef symbols may be placed wherever necessary along the staff in proper association with any note of any group within the scope of my invention which contemplates the use of cards bearing the most important individual tone groups and other musical indicia within the musical nomenclature and too numerous to herein illustrate or describe.

What I claim is:—

In a music educational appliance, a staff bearing element, a guide extending along said element, and bars adjustable along the guide for varying the length of the measures on the staff, said bars being removable endwise from the guide, and means for moving the guide about an axis for simultaneously shifting the bars to and from a position across the staff.

In witness whereof I have hereunto set my hand this 16th day of October, 1926.

EDWARD E. SCOVILL.